United States Patent
Kobayashi

(10) Patent No.: US 6,922,311 B2
(45) Date of Patent: Jul. 26, 2005

(54) THIN FILM MAGNETIC HEAD INCLUDING COIL INSULATED BY ORGANIC AND INORGANIC INSULATING MATERIALS

(75) Inventor: Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 105 days.

(21) Appl. No.: 10/405,662

(22) Filed: Apr. 2, 2003

(65) Prior Publication Data

US 2003/0189789 A1 Oct. 9, 2003

(30) Foreign Application Priority Data

Apr. 5, 2002 (JP) .................................... 2002-103705

(51) Int. Cl.⁷ ............................................. G11B 5/147
(52) U.S. Cl. ................................................ 360/126
(58) Field of Search ........................................ 360/126

(56) References Cited

U.S. PATENT DOCUMENTS

| | | | |
|---|---|---|---|
| 6,185,068 B1 * | 2/2001 | Fujita et al. | 360/123 |
| 6,204,997 B1 * | 3/2001 | Sasaki | 360/123 |
| 6,246,541 B1 * | 6/2001 | Furuichi et al. | 360/123 |
| 6,317,288 B1 * | 11/2001 | Sasaki | 360/126 |
| 6,353,511 B1 * | 3/2002 | Shi et al. | 360/126 |
| 6,353,995 B1 | 3/2002 | Sasaki et al. | 360/317 |
| 2002/0030928 A1 * | 3/2002 | Hsiao et al. | 360/123 |

* cited by examiner

Primary Examiner—David D. Davis
(74) Attorney, Agent, or Firm—Brinks Hofer Gilson & Lione

(57) ABSTRACT

A thin film magnetic head suitable for an increase in a packing density and an increase in frequency of a magnetic recorder is provided, while the reliability is maintained, and protrusion of a recording head portion from a surface facing a magnetic disk due to thermal expansion is reduced. In the region between a joint and a recording portion, the spacing dimension between the conductive layers of a first coil adjacent to each other is allowed to be equal to the height dimension of the conductive layer of the first coil, and the space of the first coil is filled in with an inorganic material portion of an insulating layer. Regarding the perimeter and the inside of the first coil, the portion which cannot be filled in with the inorganic material portion of the insulating layer leaving no space is filled in with an organic material portion, so that insulation is provided with reliability, and thermal expansion of the insulating film due to the heat release from the first coil is reduced by an inorganic material unlikely to thermally expand.

8 Claims, 7 Drawing Sheets

THIN FILM MAGNETIC HEAD INCLUDING COIL INSULATED BY ORGANIC AND INORGANIC INSULATING MATERIALS

This application claims the benefit of priority to Japanese Patent Application 2002-103705, which was filed on Apr. 5, 2002.

BACKGROUND OF THE INVENTION

1. Field of the Invention

The present invention relates to a thin film magnetic head provided, for example, on the trailing edge portion of a slider facing a magnetic recording medium. In particular, the present invention relates to a thin film magnetic head exhibiting reduced thermal expansion due to heat release from a coil used for a recording head portion.

2. Description of the Related Art

As shown in FIG. 11, a conventional thin film magnetic head is provided with a recording head portion h85 on a trailing-side edge surface 81a of a slider 81. This recording head portion h85 is an inductive head provided with a first coil 84 and a second coil 86 between a lower core layer 82 and an upper core layer 83. A joint 87 is arranged between the lower core layer 82 and the upper core layer 83, and the lower core layer 82 and the upper core layer 83 are magnetically connected by the joint 87.

The first coil 84 is formed from a conductive layer wound around the joint 87 for magnetically connecting the lower core layer 82 and the upper core layer 83. A recording portion 85 is arranged outside the first coil 84, and the recording portion 85 includes a magnetic pole portion 85a magnetically connected to the upper core layer 83 and a magnetic gap layer 85b made of an insulating material between the aforementioned lower core layer 82 and the magnetic pole portion 85a.

The space between the conductive layers constituting the first coil 84 is filled in with an organic insulating layer 88. Furthermore, the aforementioned organic insulating layer 88 is covered with an inorganic insulating film 89 made of $Al_2O_3$.

The top surface of the inorganic insulating film 89 is flattened by polishing, and the aforementioned second coil 86 is arranged on the inorganic insulating film 89. The second coil 86 is electrically connected to the first coil 84.

In a magnetic recorder equipped with a hard magnetic disk, when the recording head portion h85 magnetically records to the magnetic disk serving as a magnetic medium, the slider 81 floats above the magnetic disk with a very small clearance.

A recording current is applied to the first coil 84 and the second coil 86, magnetic fields induced by the recording current to the lower and upper core layers 82 and 83 are applied to the magnetic disk as a leakage flux with the magnetic gap layer 85b of the recording portion 85 therebetween, and information is recorded on the magnetic disk.

In such a conventional thin film magnetic head, the organic insulating layer 88 expands due to the heat release from the first coil 84, and thereby, the recording head portion h85 protrudes from the facing-surface 81b of the slider 81 facing the recording medium at the portion of the organic insulating layer 88.

In particular, regarding a thin film magnetic head capable of achieving a high packing density, since the frequency of the recording current applied to the first coil 84 is high, the heating of the first coil 84 is increased. As the heating of the first coil 84 is increased, the thermal expansion of the organic insulating layer 88 becomes significant, and the amount of protrusion of the recording head portion h85 is increased.

Regarding a magnetic recorder capable of achieving a high-density, high-speed recording, the spacing between the magnetic medium and the facing-surface 81b of the slider 81 facing thereto is reduced, and therefore, when the recording head portion h85 protrudes, the frequency of hitting the recording head portion h85 against the magnetic medium is increased. Consequently, the recording medium is likely to be damaged, or the recording head portion h85 is likely to be damaged.

SUMMARY OF THE INVENTION

It is an object of the present invention to provide a thin film magnetic head suitable for an increase in packing density and an increase in frequency of a magnetic recorder, while the reliability is maintained, and protrusion of a recording head portion from a slider is suppressed.

A thin film magnetic head according to the present invention includes a lower core layer, an upper core layer located above the aforementioned lower core layer, a joint for magnetically connecting the aforementioned lower core layer and the aforementioned upper core layer, a coil formed from a conductive layer wound around the aforementioned joint in a plurality of rows, and a recording portion located between the aforementioned lower core layer and the aforementioned upper core layer to constitute a magnetic gap, wherein, in the region between the aforementioned joint and the aforementioned recording portion, organic insulation material is provided at least one of between the aforementioned joint and the aforementioned conductive layer in the position nearest this joint and between the aforementioned recording portion and the aforementioned conductive layer in the position nearest this recording portion, an inorganic material is used to fill in a portion at which the aforementioned organic material is not provided, and inorganic insulation material is provided between the aforementioned conductive layers adjacent to each other.

Here, "between the conductive layers adjacent to each other" refers to between the Nth winding of the conductive layer and the next winding in the bottom on the lower core layer side of the conductive layer (the basal portion of the conductive layer).

In such a thin film magnetic head, the space between the conductive layer and the joint and the space between the conductive layer and the recording portion are filled in with the organic material, and thereby, insulation between the conductive layer and the joint and between the conductive layer and the recording portion can be reliably provided. Since the inorganic material has a thermal expansion coefficient smaller than that of the organic material, expansion of the recording portion can be reduced.

Preferably, the inorganic material is at least one selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN and SiON. Examples of organic materials can include resist materials, for example, a polyimide resin.

In the thin film magnetic head according to the present invention, preferably, the aforementioned joint is formed from a magnetic material provided on the aforementioned lower core layer, the aforementioned recording portion is formed from the magnetic material provided on the aforementioned lower core layer and the magnetic gap layer with no magnetism. The top surface of the aforementioned joint, the top surface of the aforementioned recording portion and the top surface of the aforementioned inorganic material layer are arranged in the same plane, and the top surface of the aforementioned conductive layer is located in the aforementioned same plane or below that.

In the aforementioned thin film magnetic head, since the top surface of the aforementioned joint and the top surface of the aforementioned recording portion are high, the depths of the spaces between the aforementioned joint and the aforementioned conductive layer in the position nearest this joint and between the aforementioned recording portion and the aforementioned conductive layer in the position nearest this recording portion are increased. However, the spaces can be completely filled in by using the organic material.

The thin film magnetic head according to the present invention is more effective in the case where the spacing between the aforementioned conductive layers adjacent to each other is greater than or equal to the height dimension of the aforementioned conductive layer in the region between the aforementioned joint and the aforementioned recording portion.

In the aforementioned thin film magnetic head, since the spacing between the conductive layers is large relative to the height dimension of the conductive layer, the space between the conductive layers can be filled in with the inorganic insulating material leaving no space. Here, "the height dimension of the conductive layer" refers to a height of the side wall surfaces facing each other between the Nth winding of the conductive layer and the next winding, where the side walls with the aforementioned space between the conductive layers therebetween are extended keeping the spacing at the basal portions.

The thin film magnetic head according to the present invention is more effective in the case where at least one of the spacing between the aforementioned joint and the aforementioned conductive layer in the position nearest this joint and the spacing between the aforementioned recording portion and the conductive layer in the position nearest this recording portion is adjusted to be smaller than the spacing between the conductive layers adjacent to each other.

In the aforementioned thin film magnetic head, the spacing between the aforementioned joint and the aforementioned conductive layer in the position nearest this joint and the spacing between the aforementioned recording portion and the conductive layer in the position nearest this recording portion are reduced, and thereby, the spacing between the conductive layers adjacent to each other can be increased. Consequently, the spacing between the conductive layers are likely to be filled in with the inorganic material leaving no space.

The thin film magnetic head according to the present invention may have a configuration in which at least one of the spacing between the aforementioned joint and the aforementioned conductive layer in the position nearest this joint and the spacing between the aforementioned recording portion and the conductive layer in the position nearest this recording portion is adjusted to be smaller than the height dimension of the aforementioned conductive layer, and the aforementioned organic material is used to fill in this small spacing portion.

In the aforementioned thin film magnetic head, the spacing between the aforementioned joint and the aforementioned conductive layer in the position nearest this joint and the spacing between the aforementioned recording portion and the aforementioned conductive layer in the position nearest this recording portion are reduced. However, the spaces can be completely filled in with the organic material.

In the thin film magnetic head according to the present invention, preferably, the spacing between the aforementioned joint and the aforementioned conductive layer in the position nearest this joint is at a minimum in the region between the aforementioned joint and the aforementioned recording portion, and is increased in the other region, while the aforementioned organic insulation material is provided between the aforementioned joint and the aforementioned conductive layer.

Regarding the aforementioned thin film magnetic head, the region between the aforementioned joint and the aforementioned conductive layer can be filled in with the inorganic material outside the region between the aforementioned joint and the aforementioned recording portion.

In the thin film magnetic head according to the present invention, preferably, the spacing between the conductive layers constituting the aforementioned coil is at a minimum in the region between the aforementioned joint and the aforementioned recording portion, and the spacing is increased in the other region.

Regarding the aforementioned thin film magnetic head, the space between the conductive layers can be filled in with the inorganic material leaving no space outside the region between the aforementioned joint and the aforementioned recording portion.

In the thin film magnetic head according to the present invention, preferably, the width dimension of the aforementioned conductive layer is at a minimum in the region between the aforementioned joint and the aforementioned recording portion, and the width dimension is increased in the other region.

Regarding the aforementioned thin film magnetic head, the direct current resistance of the coil can be reduced without any extension of a magnetic path length.

DESCRIPTION OF THE PREFERRED EMBODIMENTS

Figure 1:
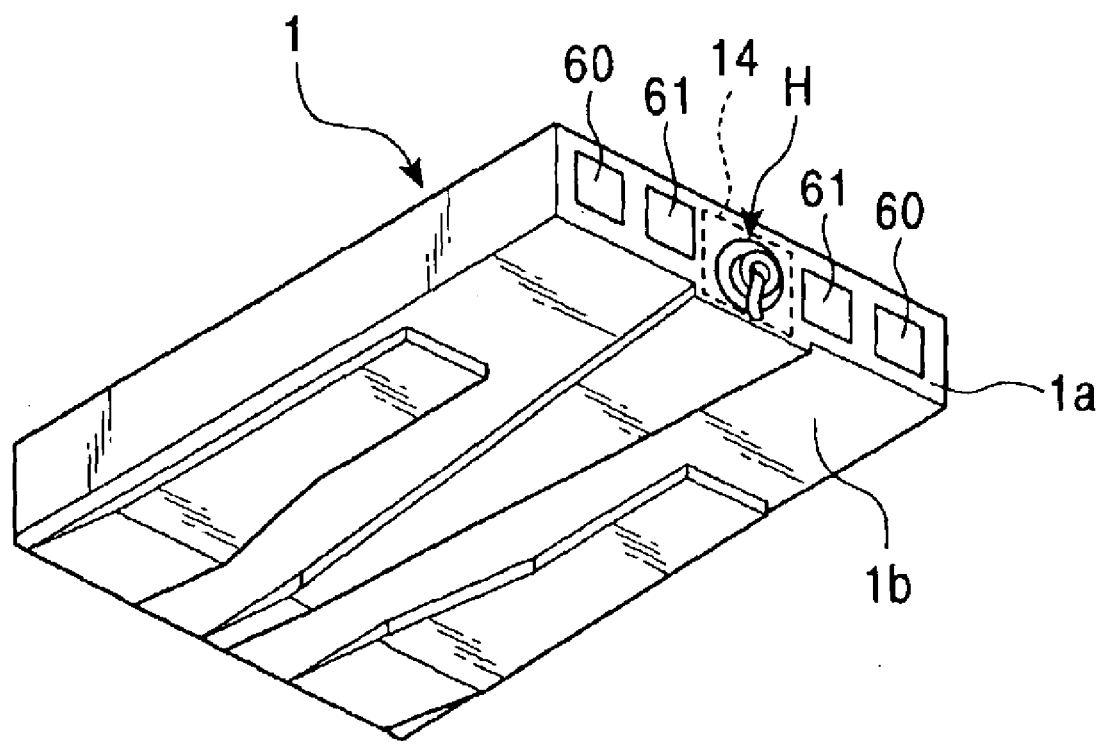
FIG. 1 is an overall external view of a slider provided with a thin film magnetic head according to the present invention.

A magnetic head device shown in FIG. 1 includes a slider 1 made of $Al_2O_3$—TiC substantially in the shape of a rectangular parallelepiped. The facing-surface 1b thereof faces a recording medium serving as a hard magnetic disk. A thin film magnetic head H and terminal layers 60, 60 and terminal layers 61, 61 are arranged on the edge surface 1a on the trailing side of the aforementioned slider 1. A coil of a recording head portion of the aforementioned thin film magnetic head H is connected to the aforementioned terminal layers 60, 60. When a magnetoresistance effect element of a playback head portion is provided, a detection current is applied to the aforementioned magnetoresistance effect element from the aforementioned terminal layers 61, 61, and a playback magnetic signal is provided from the aforementioned terminal layers 61, 61.

Figure 2:
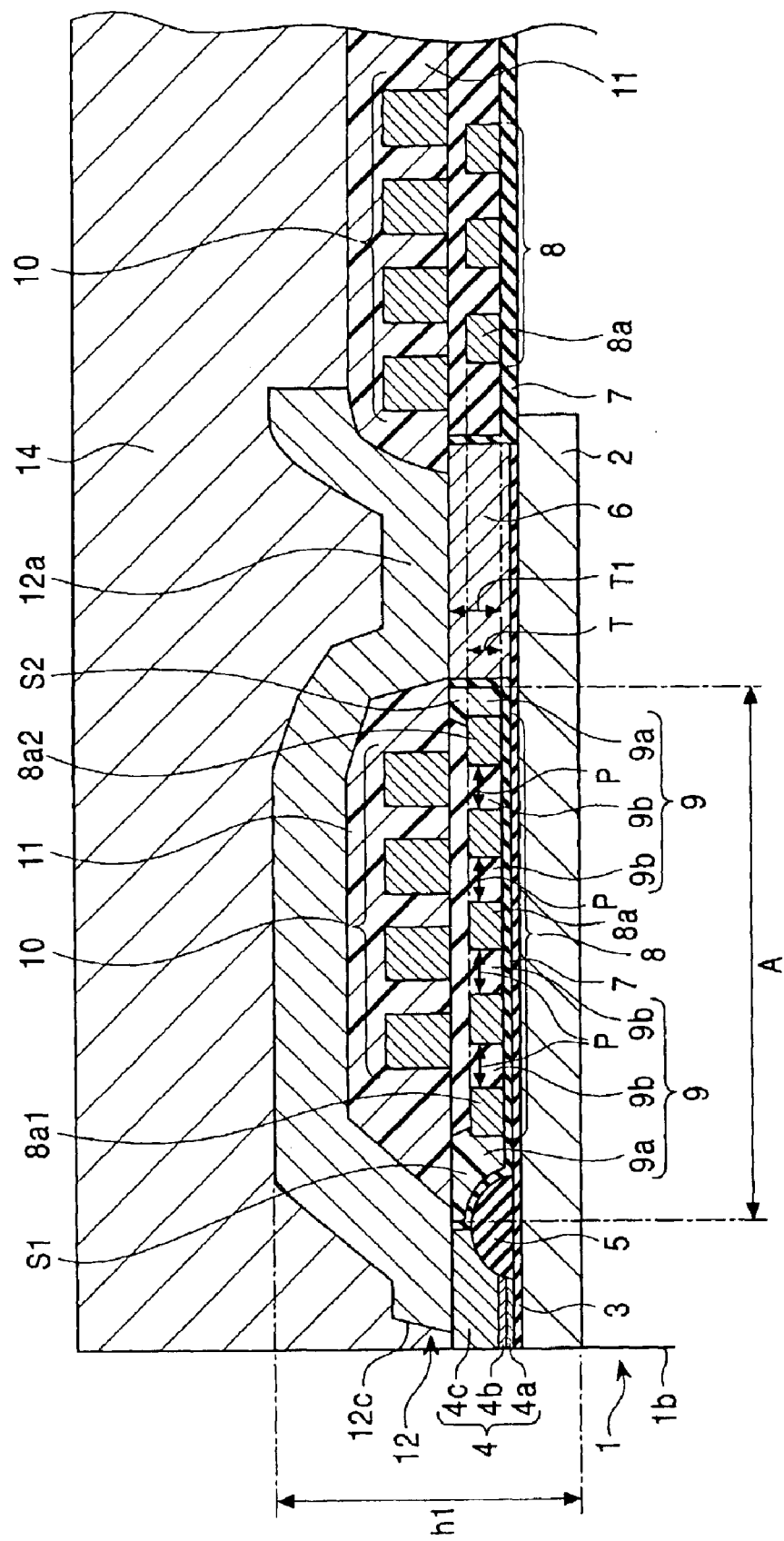
FIG. 2 is a sectional view of a thin film magnetic head according to an embodiment of the present invention.
Figure 3:
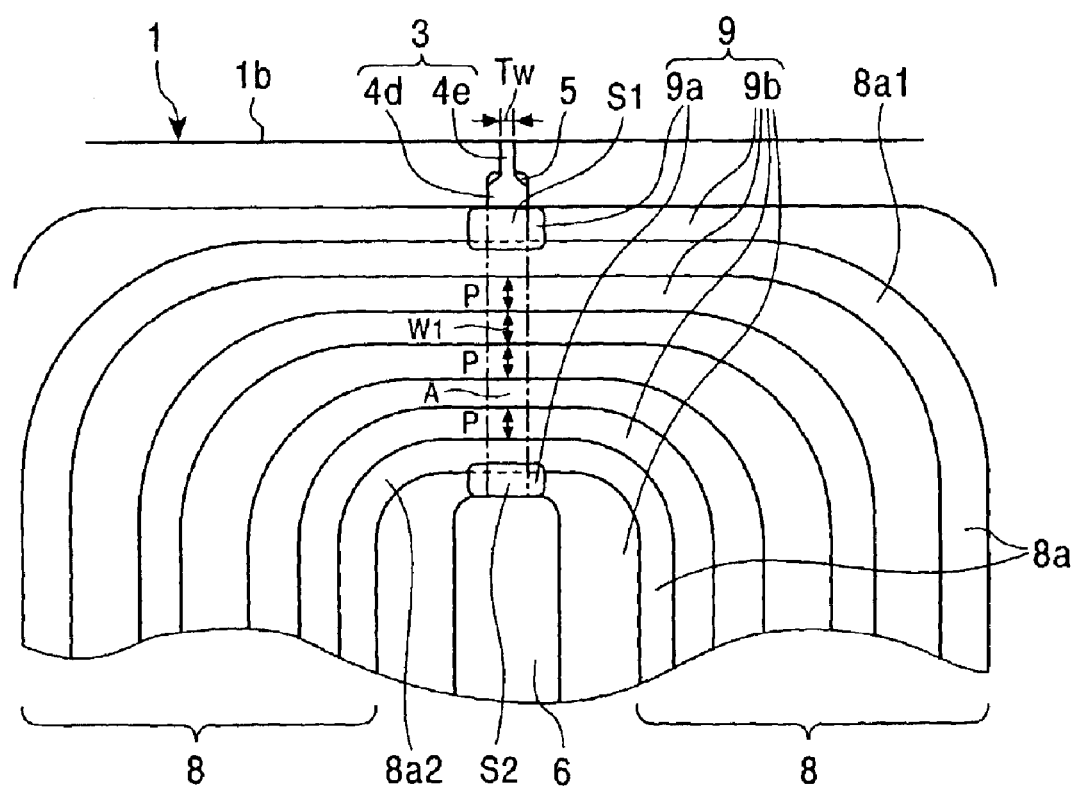
FIG. 3 is a plan view of the thin film magnetic head according to the embodiment of the present invention with the upper portion cut away.

FIG. 2 is a sectional view of a thin film magnetic head according to an embodiment of the present invention. In FIG. 2, simply a recording head portion h1 is illustrated, and a playback head portion located below the aforementioned recording head portion h1 is not shown in the drawing. FIG. 3 is a plan view simply showing a coil portion of the thin film magnetic head according to the embodiment of the present invention.

The recording head portion h1 of the thin film magnetic head shown in FIG. 2 is an inductive head. In this inductive head, a lower core layer 2 is formed from a magnetic, metallic material, e.g. NiFe, by plating. The edge thereof is exposed at the facing-surface 1b. A plating substrate layer 3 made of a conductive material is laminated on the aforementioned lower core layer 2.

A recording portion 4 is formed by plating on the aforementioned plating substrate layer 3 on the facing-surface 1b side. As shown in FIG. 3, the recording portion 4 is composed of a base 4d and a tip 4e extending from the base 4d toward the facing-surface 1b side with a predetermined width dimension. The tip 4e of the recording portion 4 is exposed at the aforementioned facing-surface 1b. In a thin film magnetic head suitable for a high packing density, the tip 4e of the recording portion 4 is formed to have the width dimension (track width Tw) of preferably 0.7 μm or less, and more preferably, 0.5 μm or less.

The aforementioned recording portion 4 has a three-layer structure composed of a lower magnetic pole layer 4a formed from a magnetic, metallic material grown through plating on the plating substrate layer 3, a gap layer 4b formed from a non-magnetic metal, e.g. NiP, grown through plating on the aforementioned lower magnetic pole layer 4a, and an upper magnetic pole layer 4c formed from a magnetic, metallic material grown through plating on the aforementioned gap layer 4b.

The aforementioned lower magnetic pole layer 4a and the upper magnetic pole layer 4c may be formed from the same magnetic material as that of the aforementioned lower core layer 2 and upper core layer 12. However, preferably, these are formed from a magnetic material having a saturation magnetic flux density higher than that of the aforementioned lower core layer 2 and upper core layer 12.

In the present embodiment, an insulating layer 5 for determining Gd is formed from an organic material inside the aforementioned facing-surface 1b. The rear ends of the lower magnetic pole layer 4a and the gap layer 4b of the recording portion 4 are in contact with the aforementioned facing-surface 1b side of the insulating layer 5 for determining Gd, and the depth dimension of the aforementioned gap layer 4b is determined by the aforementioned insulating layer 5 for determining Gd.

The upper magnetic pole layer 4c of the recording portion 4 is formed while the rear end thereof overlaps the insulating layer 5 for determining Gd.

A joint 6 made of a magnetic, metallic material is formed as a lift layer by plating on the aforementioned plating substrate layer 3 inside the thin film magnetic head, and this joint 6 is magnetically connected to the lower core layer 2. The top surface of the joint 6 is flattened, and is arranged in the same plane as that of the top surface of the recording portion 4.

In the region except for the aforementioned recording portion 4 and the aforementioned joint 6, an insulating substrate layer 7 is formed covering the aforementioned plating substrate layer 3 and the insulating layer 5 for determining Gd, and a first coil 8 is provided on the aforementioned insulating substrate layer 7.

The first coil 8 is formed from a conductive layer 8a made of Cu or the like, wound around the joint 6. This conductive layer 8a is wound around the aforementioned joint 6 in the shape of a planar helix. Consequently, a plurality of rows of the aforementioned conductive layers 8a are located in the region A between the aforementioned joint 6 and the recording portion 4. The spacing between the conductive layer 8a2, which is the innermost winding of the first coil 8, and the joint 6 is at a minimum in the aforementioned region A between the recording portion 4 and the joint 6, and the spacing is increased in the region other than the aforementioned region A.

The spacing between the conductive layers 8a of the first coil 8 adjacent to each other is a constant spacing dimension (P) in the region A between the recording portion 4 and the joint 6, and this spacing dimension (P) is at a minimum. The spacing dimension of the aforementioned conductive layers 8a in the region other than the region A is increased compared with the spacing in the aforementioned region A. Here, "a spacing of the conductive layers 8a" refers to a spacing formed between the Nth winding of the conductive layer and the next winding in the bottom on the lower core layer 2 side of the conductive layer 8a (the basal portion of the conductive layer 8a).

The width dimension of the conductive layer 8a of the first coil 8 is at a minimum, W1, in the region A between the recording portion 4 and the joint 6, and the aforementioned width dimension is increased in the region other than the aforementioned region A.

In the region A between the aforementioned recording portion 4 and the joint 6, the spacing between the conductive layers 8a of the first coil 8 adjacent to each other and the width of the conductive layer 8a are small, the space S2 between the conductive layer 8a2 located in the innermost winding and the joint 6 is small, the space S1 between the recording portion 4 and the conductive layer 8a1 of the outermost winding of the first coil 8 is small, and the dimensions thereof are increased in the region other than the aforementioned region A. In this manner, the spacing between the recording portion 4 and the joint 6 can be reduced, and the magnetic path length can be reduced. Consequently, the inductance becomes low, and it becomes possible to respond to an increase in frequency.

Furthermore, when the width of the conductive layer 8a of the first coil 8 is increased outside the region A, the direct current resistance of the first coil 8 can be reduced without extension of the magnetic path length, and the Joule heat generated at the conductive layer 8a of the first coil 8 can be reduced.

The height dimension T of the conductive layer 8a constituting the first coil 8 from the insulating substrate layer 7 is constant. Here, "the height dimension of the conductive layer 8a" refers to the height of the side wall surfaces facing each other between the Nth winding of the conductive layer 8a and the next winding, while the side walls with the aforementioned space between the conductive layers therebetween are extended keeping the spacing at the basal portions.

The spacing dimension P between the conductive layers 8a of the first coil 8 adjacent to each other is the same as the height dimension T of the first coil 8 in the region A between the recording portion 4 and the joint 6, and the spacing dimension P is formed to be greater than the height dimension T of the first coil 8 in the region outside the region A.

The conductive layer 8a of the first coil 8 is formed in the side nearer to the lower core layer 2 than are the top surface of the joint 6 and the top surface of the recording portion 4. That is, the height dimension T of the conductive layer 8a of the first coil 8 is smaller than the height dimension T1 from the insulating substrate layer 7 provided with the first coil 8 to the top surfaces of the recording portion 4 and the joint 6.

Figure 6:
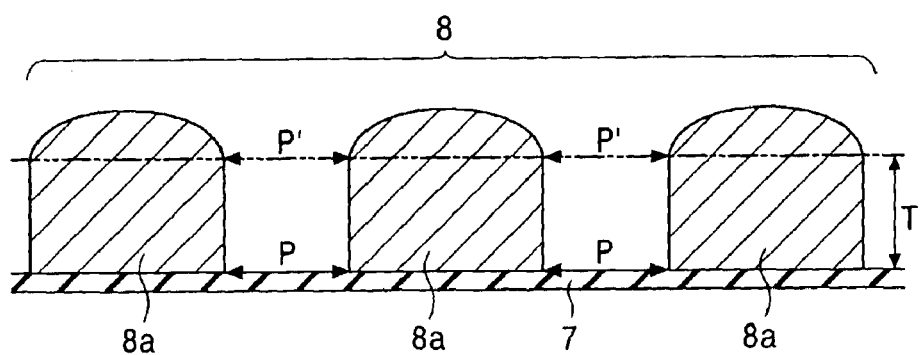
FIG. 6 is a diagram illustrating an example of a coil cross-section of a thin film magnetic head according to the present invention.

In the embodiment shown in FIG. 2, the side wall surface of the conductive layer 8a of the first coil 8 is perpendicular to the lower core layer 2. However, in some cases, the top surface of the conductive layer 8a of the first coil 8 is formed into a convex, curved surface, as shown in FIG. 6, depending on a manufacturing process. Regarding the aforementioned first coil 8, the spacing P' at the upper end of the conductive layer 8 sometimes becomes greater than the spacing dimension P at the basal portion on the lower core layer 2 side. In this case, the spacing of the first coil 8 refers to the spacing dimension P at the basal portion. In this case as well, the height dimension of the conductive layer 8a of the first coil 8 refers to the height dimension T of the side wall surface extending upward in the shape of a plane.

Figure 7:
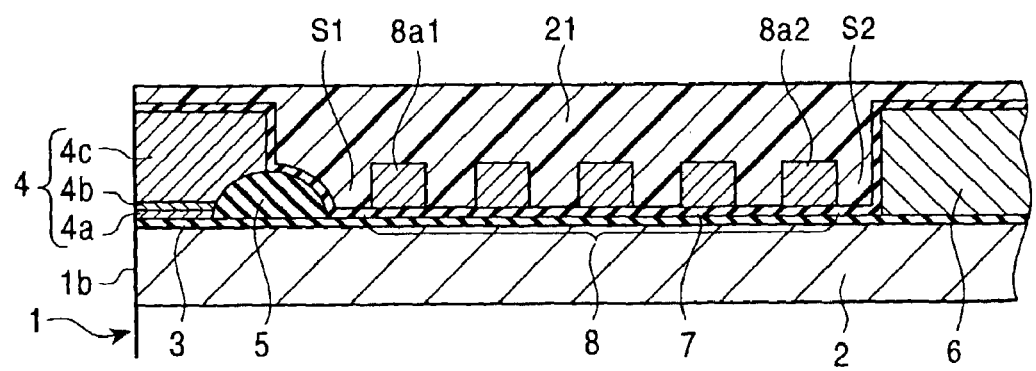
FIG. 7 is a diagram illustrating an example of a method for manufacturing a thin film magnetic head according to the present invention.

Regarding the present embodiment, when the shape is as shown in FIG. 7, the aforementioned spacing P and the aforementioned height dimension T of the conductive layer 8a of the first coil 8 are preferably equal in the region A between the recording portion 4 and the joint 6.

An insulating film 9 covering the first coil 8 is formed to have a flat top surface in the same plane as that of the top surface of the joint and the top surface of the recording portion 4. The aforementioned insulating film 9 is composed of an organic material portion 9a made of an organic material, e.g. a resist, and an inorganic material portion 9b made of an inorganic material, e.g. $Al_2O_3$, and the primary portion is the inorganic material portion 9b.

In the region A between the recording portion 4 and the joint 6, the space portion having the spacing dimension P between the conductive layers 8a adjacent to each other is filled in with the inorganic material portion 9b of the insulating film 9 leaving no space. The space between the conductive layers 8a of the first coil 8 is filled in with the inorganic material portion 9b leaving no space outside the region A as well.

In order to fill in the space between the conductive layers 8a of the first coil 8 with the inorganic material portion 9b leaving no space, as described above, the spacing between the conductive layers 8a adjacent to each other must be equal to the height dimension T of the first coil 8, as described above, or be greater than the aforementioned height dimension T.

The inorganic material portion 9b of the insulating film 9 is formed to have a thickness greater than the height dimension T of the first coil 8, so that the space between the conductive layers 8a of the first coil 8 is filled in from the basal portion to the top edge, and in addition, the inorganic material portion 9b is formed on the conductive layer 8a.

In the region A between the aforementioned joint 6 and the aforementioned recording portion 4, the spacing dimension in the space S2 between the conductive layer 8a2, which is the innermost winding of the first coil 8, and the joint 6 is smaller than the height dimension T of the aforementioned conductive layer 8a, and the spacing dimension in the space S1 between the conductive layer 8a1, which is the outermost winding, and the aforementioned recording portion 4 is smaller than the aforementioned height dimension T.

As shown in FIG. 3, in the region A between the aforementioned joint 6 and the aforementioned recording portion 4, the aforementioned space portions S1 and S2 are filled in with the organic material leaving no space, and thereby, the aforementioned organic material portions 9a are formed. This organic material portion 9a is formed to have a thickness greater than the height dimension T of the conductive layer 8a of the first coil 8, so that the organic material portion 9a covers a part of the top surfaces of the conductive layer 8a2, which is the innermost winding of the first coil 8, and the conductive layer 8a1 which is the outermost winding.

Regarding the aforementioned spaces S1 and S2, since the spacings between the recording portion 4 and the conductive layer 8a1 and between the joint 6 and the conductive layer 8a2 are small, when the aforementioned inorganic material is formed in these portions by sputtering and the like, cavities are likely to be formed in the aforementioned spaces. However, when the space portions S1 and S2 are filled in with the organic material having fluidity, the aforementioned spaces S1 and S2 can be reliably filled in.

Preferably, the volume of the organic material portion 9a is made to be a minimum as long as the aforementioned spaces S1 and S2 can be filled in leaving no space. That is, in the perimeter of the first coil 8, preferably, the organic material portion 9a is provided simply in the rear region of the recording portion 4 and the insulating layer 5 for determining Gd, in the plan view shown in FIG. 3. Likewise, inside the first coil 8, preferably, the organic material portion 9a is provided between the joint 6 and the first coil 8 simply in the region A between the recording portion 4 and the joint 6, and the inorganic material 9b is provided in the other region.

The second coil 10 is formed from a conductive layer made of Cu or the like, wound around the aforementioned joint 6 in the shape of a planar helix as well. The second coil 10 is formed on the aforementioned inorganic material portion 9b arranged on the first coil 8. The first coil 8 and the second coil 10 are connected to each other by the central portion penetrating through the insulating layer 9. The first coil 8 and the second coil 10 are insulated from each other except for the central portion by the insulating film 9.

The second coil 10 is covered with the coil insulating layer 11. The coil insulating layer 11 is made from an organic insulating material, e.g. a resist, fills in the space between the conductive layers of the second coil 10 adjacent to each other, and covers the top surface of the second coil 10. The top surface of the joint 6 is exposed at the coil insulating layer 11.

The upper core layer 12 is arranged on the coil insulating layer 11, the base portion 12a is connected to the top surface of the joint 6, and the tip 12c is connected to the top surface of the recording portion 4. The tip 12b (not shown in the drawing) of the upper core layer 12 is arranged without exposure at the facing-surface 1b.

The recording head portion h1 in which the first coil 8 and the second coil 10 are arranged between the lower core layer 2 and the upper core layer 12 is covered with a protective layer 14. The protective layer 14 is made of $AlSiO_3$, $Al_2O_3$, or other insulating material.

The terminal layers 60, 60 and the terminal layers 61, 61 shown in FIG. 1 are arranged on the protective layer 14. Each of these terminal layers 60, 60 and the terminal layers 61, 61 is any one of metallic materials, Au, Ag, Pt and Cu, having small resistivities, an alloy composed of at least two of the aforementioned metallic materials, or a laminate composed of at least two of the aforementioned metallic materials.

The edge (not shown in the drawing) of the first coil 8 and the edge (not shown in the drawing) of the second coil 10 of the aforementioned recording head portion h1 are individually brought into conduction with, for example, any one of the aforementioned terminal layers 60, 60. Although not shown in FIG. 2, a replay head portion including a magnetoresistance effect element is provided under the recording head portion h1, and the aforementioned magnetoresistance effect element is brought into conduction with, for example, the aforementioned terminal layers 61, 61.

The aforementioned terminal layers 60, 60 and the aforementioned terminal layers 61, 61 function as so-called bonding pads, and a wire connected to each of the aforementioned terminal layers or a lead of a flexible printed wiring board is brought into conduction with an electric circuit provided in a magnetic recording, playback device.

Regarding the recording head portion h1 in the aforementioned embodiment, the space between the conductive layers 8a of the aforementioned first coil 8 adjacent to each other is filled in with the inorganic material portion 9b leaving no space in the aforementioned region A at the rear of the recording portion 4.

Consequently, the heat released from the first coil 8 is likely to conduct to the region other than the region A through the inorganic material portion 9b, and thereby, the amount of protrusion of the recording portion 4 and its surroundings from the facing-surface 1b can be reduced. Furthermore, in the aforementioned region A, the space S1 between the recording portion 4 and the conductive layer 8a1 and the space S2 between the joint 6 and the conductive layer 8a2 can be reduced, and the magnetic path can be reduced, so that the inductance can be reduced. In addition, since the aforementioned spaces S1 and S2 are filled in with the organic material portions 9a, the insulation between the recording portion 4 and the first coil 8 and the insulation between the joint 6 and the first coil 8 can be reliably provided.

A method for manufacturing the aforementioned recording head portion h1 will be described.

The plating substrate layer 3 for forming the recording portion 4 and the joint 6 by plating is formed on the lower core layer 2 by sputtering, and thereafter, the insulating layer 5 for determining Gd is formed on the plating substrate layer 3. After the insulating layer 5 for determining Gd is formed, a resist frame patterned with the outside shapes of the recording portion 4 and the joint 6 is formed on the plating substrate layer 3, and the recording portion 4 and the joint 6 are formed by a frame-plating method. The film thickness of the recording portion 4 and the height of the joint 6 at this time are greater than the film thickness of the recording portion 4 in the completed recording head portion h1 and the height of the joint 6 (T1).

The insulating substrate layer 7 covering the plating substrate layer 3, the insulating layer 5 for determining Gd, recording portion 4 and the joint 6 is formed by sputtering, and a plating substrate 20 for forming the first coil 8 by plating is formed on the insulating substrate layer 7 by sputtering.

Figure 4:
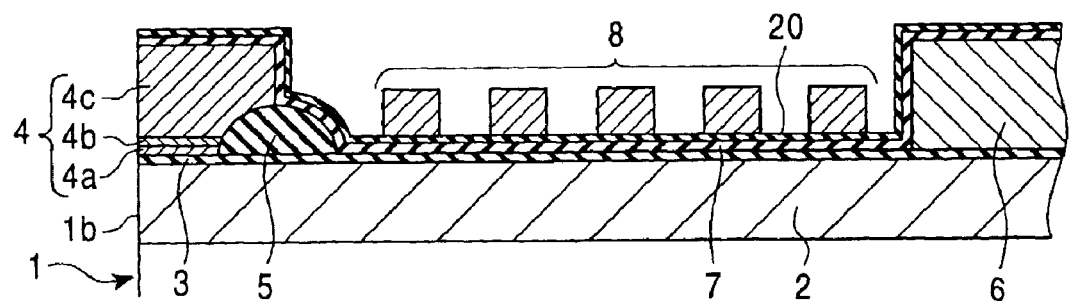
FIG. 4 is a diagram illustrating an example of a method for manufacturing a thin film magnetic head according to the present invention.
Figure 5:
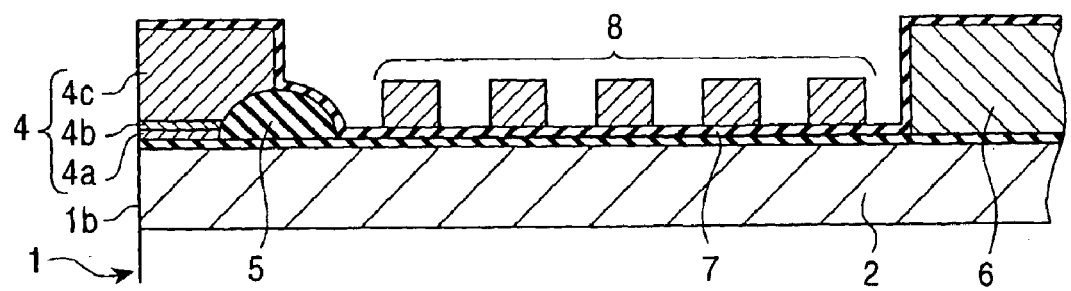
FIG. 5 is a diagram illustrating an example of a method for manufacturing a thin film magnetic head according to the present invention.

A resist frame (not shown in the drawing) patterned with the shape of the first coil 8 is formed on the plating substrate 20, and the first coil 8 is formed by a frame-plating method, as shown in FIG. 4. After the resist frame is removed, the plating substrate 20 arranged outside the pattern of the first coil 8 is removed in an ion milling step, as shown in FIG. 5.

In the ion milling step, the plating substrate 20 is cut by ion irradiation, and in addition, the first coil 8 is also subjected to the ion irradiation. The corner portions of the first coil 8 are cut by the ion irradiation, and the top surfaces are sometimes made into curved surfaces, as shown in FIG. 6.

At that point in time when the ion milling step is completed, the height (T) of the first coil 8 including the plating substrate layer 20 and the spacing dimension (P) of the first coil 8 become equal. At that point in time when the ion milling step is completed, the height of the recording portion 4 and the height of the joint 6 are adequately higher than the height (T) of the first coil 8.

After the ion milling step, a resist film 21 covering all of the first coil 8 is applied by coating, as shown in FIG. 7. At this time, although the space S1 between the recording portion 4 and the conductive layer 8a1 and the space S2 between the joint 6 and the conductive layer 8a2 are narrow and deep, these are filled in with the resist film 21 leaving no space.

Figure 8:
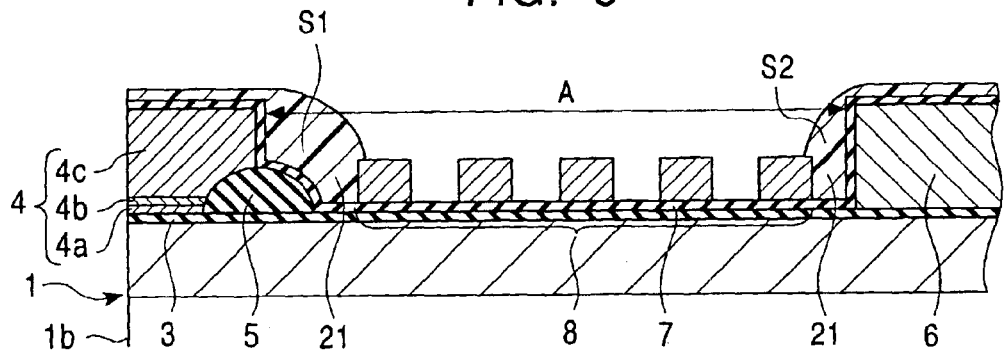
FIG. 8 is a diagram illustrating an example of a method for manufacturing a thin film magnetic head according to the present invention.

As shown in FIG. 8, the resist film 21 is removed except for the portions filling in the space S1 and the space S2. However, at this time, the resist film 21 may remain on the recording portion 4 and the joint 6. The resist films 21 left in the space S1 and the space S2 become organic material portions 9a of the insulating film 9.

Here, in contrast to the aforementioned embodiment, when films of an inorganic insulating material, e.g. $Al_2O_3$, are formed in the aforementioned space S1 and space S2 by sputtering, the sputtered films in the space S1 and the space S2 include cavities at the portions located behind the recording portion 4 and the joint 6 during film formation by the sputtering, and therefore, insufficient insulation may be brought about. The space S1 and the space S2 must be greater than at least the height dimension of the recording portion 4 and the joint 6 in order that the aforementioned space S1 and space S2 are filled in with the inorganic material leaving no space. When constructed as described above, the spacing between the recording portion 4 and the joint 6 is excessively increased. Consequently, the magnetic path length is increased, and therefore, the inductance is increased. However, in the aforementioned embodiment, since the aforementioned space S1 and space S2 are filled in with the organic material, the aforementioned spaces S1 and S2 can be reliably filled in even when the spacings of the spaces S1 and S2 are allowed to be smaller than the height dimension T of the conductive layer 8a, and therefore, the spacing between the recording portion 4 and the joint 6 is reduced.

Figure 9:
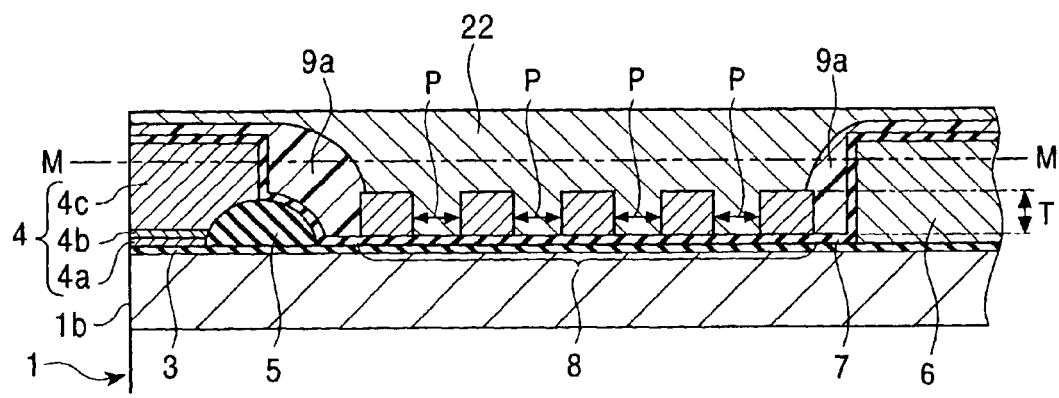
FIG. 9 is a diagram illustrating an example of a method for manufacturing a thin film magnetic head according to the present invention.

After the organic material portion 9a of the insulating film 9 is formed, an alumina film 22 to become the inorganic material portion 9b of the insulating film 9 is formed on the first coil 8 by sputtering, as shown in FIG. 9. In the region A between the recording portion 4 and the joint 6, the spacing dimension P between the conductive layers 8a of the first coil 8 adjacent to each other is equal to the height dimension T of the first coil 8, and therefore, the space between the conductive layers of the first coil 8 can be filled in leaving no space with the alumina film 22 formed by sputtering.

Since the spacing between the conductive layers 8a of the first coil 8 is greater than or equal to the height dimension T of the first coil 8 outside the aforementioned region A, the space of the first coil 8 can be filled in leaving no space with the alumina film 22 formed by sputtering in the region other than the region A.

Figure 10:
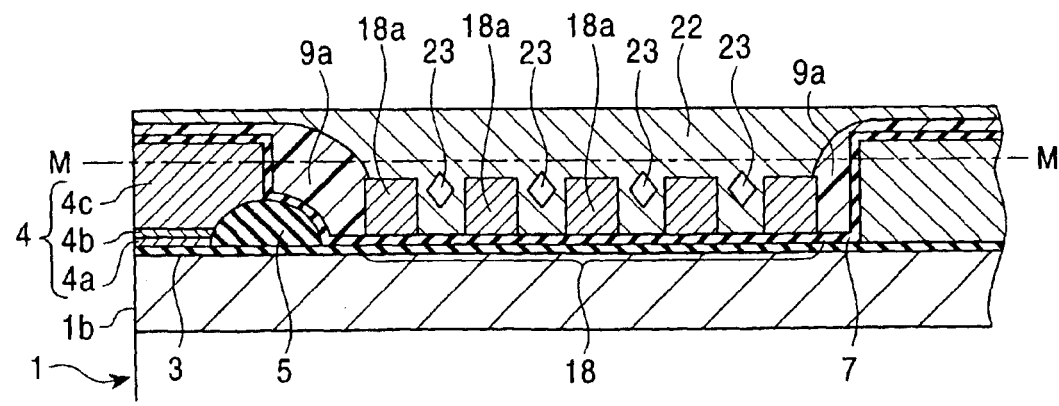
FIG. 10 is a sectional view of a thin film magnetic head different from that in the present invention.
Figure 11:
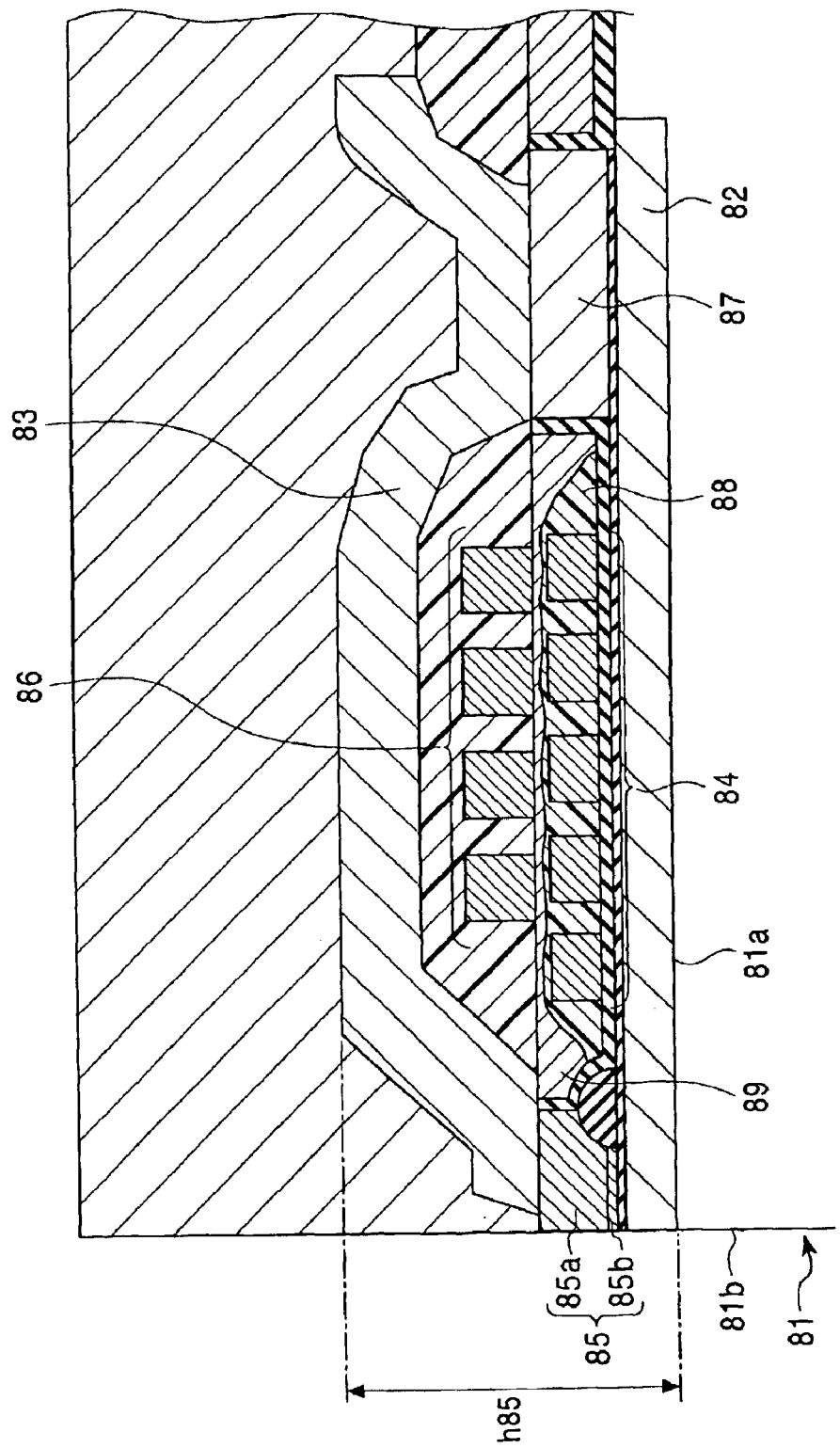
FIG. 11 is a sectional view of a conventional thin film magnetic head.

FIG. 10 shows a comparative example relative to the aforementioned embodiment. When the spacing between the conductive layers 18a constituting the coil 18 is smaller than the height dimension of the first coil 18, as in this comparative example, undesirably, the alumina film 22 may include cavities 23 in the portions behind the side wall surfaces of the first coil 18 during the film formation by sputtering.

After the insulating film 9 covering the first coil 8 is formed, the insulating film 9, the recording portion 4 and the joint 6 are polished by a CMP (Chemical Mechanical Polishing) method. Consequently, the top surface of the insulating film 9, the top surface of the recording portion 4 and the top surface of the joint 6 are made to be flat surfaces in the same plane (indicated by M—M in FIG. 9).

In this polishing step, the insulating film 9, the recording portion 4 and the joint 6 must be cut away to some degree of depth in order to allow the top surfaces of the insulating film 9, the recording portion 4 and the joint 6 to become smoother surfaces. The insulating film 9 must be left on the first coil 8 in order to maintain insulation between the first coil 8 and the second coil 10.

When the heights of the recording portion 4 and the joint 6 are increased, and the thickness of the insulating layer 9 on the first coil 8 is increased in advance of the polishing step, the top surfaces of the insulating film 9, the recording portion 4 and the joint 6 can be made smooth during the polishing step without exposure of the first coil 8 at the insulating film 9.

Furthermore, when the heights of the recording portion 4 and the joint 6 are increased, and the thickness of the insulating layer 9 on the first coil 8 is increased in advance of the polishing step, even if the insulating film 9 is cut away to the extent deeper than the predetermined depth due to variations in control during the polishing step, exposure of the first coil 8 at the insulating film 9 and cutting of the first coil 8 can be prevented. When the first coil 8 is cut, undesirably, variations are caused in the direct current resistance of the first coil 8.

If cavities 23 as shown in FIG. 10 are included in the insulating film 9, when the insulating film 9 is cut to the cavity portion during this polishing step, a chemical agent, water and the like enters into the cavity portion. When the chemical agent and the like remains in the cavity portion of the insulating film 9, corrosion of the first coil 8 is thereby caused, and the magnetic characteristics of the recording head portion h1 is thereby adversely affected.

After the polishing step, the second coil 10 is formed on the flattened top surface of the insulating film 9 by the frame-plating method in a manner similar to that in the first coil 8. Since the top surface of the insulating film 9 is made to be smooth by polishing, the second coil 10 can be precisely formed. The second coil 10 is covered with the coil insulating layer 11, and thereafter, the upper core layer 12 is formed on the coil insulating layer 11 by the frame-plating method, so that the manufacture of the recording head portion h1 is completed.

The magnetic head device shown in FIG. 1 is mounted on a magnetic recording, playback device, e.g. a hard magnetic disk device. Regarding this magnetic head device, the slider 1 is supported by an elastic support member formed from a thin leaf spring, and the facing-surface 1b of the slider 1 faces a magnetic recording medium, e.g. a magnetic disk (not shown in the drawing). When the aforementioned magnetic recording medium is rotated, the slider 1 floats over the magnetic recording medium with a very small clearance due to an air flow on the surface thereof, or the slider slides over the magnetic recording medium.

When a recording current is applied to the first coil 8 and the second coil 10 of the recording head portion h1, the recording current passes through the first coil 8 and the second coil 10. Magnetic fields of the lower core layer 2 and the upper core layer 12 induced by the recording current become leakage magnetic fields in the gap layer 4b, and the magnetic recording medium is magnetized by the leakage magnetic fields.

At this time, the Joule heat is generated at the first coil 8 and the second coil 10 by the recording current. The insulating film 9 and the coil insulating layer 11 are heated by the Joule heat generated at the first coil 8 and the second coil 10, and expand.

The insulating film 9 covering the first coil 8 primarily contains the inorganic material portion 9b unlikely to thermally expand, and the portions occupied by the organic material portion 9a likely to thermally expand is reduced to a minimum. Consequently, the insulating film 9 does not significantly expand by the heat release from the first coil 8 and the second coil 10.

Since the insulating film 9 is unlikely to thermally expand, even when the temperatures of the first coil 8 and the second coil 10 are increased with an increase in current passing through the first coil 8 and the second coil 10, the protrusion of the recording head portion h1 from the facing-surface 1b can be reduced.

The coil insulating layer 11 covering the second coil 10 is a resist having a high thermal expansion coefficient. However, since the expansion of the coil insulating layer 11 is likely to be absorbed by the protective layer 14 side, the amount of protrusion of the recording head portion h1 from the facing-surface 1b due to the expansion of the coil insulating layer 11 is small.

In order to further reduce the protrusion of the recording head portion h1 from the facing-surface 1b, preferably, the coil insulating layer 11 covering the second coil 10 is also made of the inorganic material.

When the coil insulating layer 11 is made of the inorganic material, preferably, the spacing of the second coil 10 is allowed to be equal to the height dimension of the second coil 10, so that the coil insulating layer 11 can fill in the space of the second coil 10 leaving no space.

When the coil insulating layer 11 to cover the second coil 10 is formed, the second coil 10 has been arranged on a flat surface composed of the top surface of the joint 6, the top surface of the recording portion 4 and the top surface of the insulating film 9 (hereafter referred to as a coil formation surface). The inorganic insulating material to become the coil insulating layer 11 is formed into a film all over the aforementioned coil formation surface by sputtering so as to cover the second coil 10.

In the sputtering film formation of the coil insulating layer 11, since nothing has been formed on the perimeter and the inside of the second coil 10, the sputtered coil insulating layer 11 does not cause cavities in every portion of the perimeter and the inside of the second coil 10. Consequently, it is unnecessary to provide any organic material portion in the coil insulating layer 11.

After the coil insulating layer 11 is formed by sputtering, the coil insulating layer 11 is removed by etching except for the portion covering the second coil 10, and therefore, the top surface of the joint 6 and the top surface of the recording portion 4 become in a state of being exposed at the coil insulating layer 11.

In the aforementioned embodiment, the space was provided between the first coil 8 and the insulating layer 5 for determining Gd. However, the perimeter edge of the first coil 8 may be formed to overlap the insulating layer 5 for determining Gd. Furthermore, the insulating layer 5 for determining Gd may not be provided.

In the aforementioned embodiment, the first coil 8 and the second coil 10 were provided. However, the first coil 8 may be simply provided without providing the second coil 10.

In this manner, the insulating layer 9 covering the first coil 8 is unlikely to expand even when heated by the heat release from the first coil 8 and the second coil 10. As a result, the amount of the thermal expansion of the recording head portion h1 is reduced, and the protrusion of the recording head portion h1 from the facing-surface 1b is reduced. Consequently, regarding even the hard magnetic disk device having a reduced spacing between the magnetic-disk-facing-surface 1b of the slider 1 and the magnetic recording medium (magnetic disk) with an increase in packing density and an increase in frequency, the recording head portion h1 can be prevented from directly hitting the magnetic recording medium.

Regarding the thin film magnetic head according to the present invention, in the region between the joint and the recording portion, organic insulation material is provided at least one of between the joint and the conductive layer in the position nearest this joint and between the recording portion and the conductive layer in the position nearest this recording portion, and the inorganic material is used to fill in a portion at which the aforementioned organic material is not provided, so that the aforementioned inorganic insulation material is provided between the aforementioned conductive layers adjacent to each other.

In the aforementioned thin film magnetic head, the space between the joint and the conductive layer in the position nearest this joint and the space between the recording portion and the conductive layer in the position nearest this recording portion can be filled in with reliability. Since the inorganic material is unlikely to thermally expand, the protrusion of the recording head portion from the facing-surface of the slider due to thermal expansion can be prevented, and therefore, the recording head portion can be prevented from directly hitting the magnetic recording medium.

What is claimed is:

1. A thin film magnetic head comprising a lower core layer, an upper core layer located above the lower core layer, a joint for magnetically connecting the lower core layer and the upper core layer, a coil formed from a conductive layer wound around the joint in a plurality of rows, and a recording portion located between the lower core layer and the upper core layer to constitute a magnetic gap, wherein, in the region between the joint and the recording portion, organic insulation material is provided at least one of between the joint and the conductive layer in a position nearest the joint and between the recording portion and the conductive layer in a position nearest the recording portion, an inorganic material is used to fill in a portion at which the organic material is not provided, and inorganic insulation material extending from a base of the coil to a top of the coil is provided between rows of the coil adjacent to each other.

2. The thin film magnetic head according to claim 1, wherein the joint comprises a magnetic material provided on the lower core layer, the recording portion comprises the magnetic material provided on the lower core layer and the magnetic gap layer with no magnetism, a top surface of the joint, a top surface of the recording portion and a top surface of the inorganic material layer are arranged in a first same plane, and a top surface of the conductive layer is located one of in and below the first plane.

3. The thin film magnetic head according to claim 1, wherein a spacing between the rows of the coil adjacent to each other is at least a height dimension of the conductive layer in the region between the joint and the recording portion.

4. The thin film magnetic head according to claim 1, wherein at least one of a spacing between the joint and the conductive layer in the position nearest the joint and the spacing between the recording portion and the conductive layer in the position nearest the recording portion is adjusted to be smaller than a spacing between the rows of the coil adjacent to each other.

5. The thin film magnetic head according to claim 4, wherein a small spacing portion formed of at least one of a spacing between the joint and the conductive layer in the position nearest the joint and a spacing between the recording portion and the conductive layer in the position nearest the recording portion is adjusted to be smaller than a height dimension of the conductive layer, and the organic material is used to fill in the small spacing portion.

6. The thin film magnetic head according to claim 1, wherein a spacing between the joint and the rows of the coil in the position nearest the joint is at a minimum in the region between the joint and the recording portion, and a spacing is increased in a region more proximate to the joint, while organic insulation material is provided between the joint and the conductive layer.

7. The thin film magnetic head according to claim 1, wherein a spacing between the rows of the coils is at a minimum in the region between the joint and the recording portion, and a spacing is increased in a region more proximate to the joint.

8. The thin film magnetic head according to claim 1, wherein a width dimension of the conductive layer is at a minimum in the region between the joint and the recording portion, and a width dimension is increased in a region more proximate to the joint.

* * * * *

UNITED STATES PATENT AND TRADEMARK OFFICE
CERTIFICATE OF CORRECTION

PATENT NO.      : 6,922,311 B2
DATED           : July 26, 2005
INVENTOR(S)     : Kiyoshi Kobayashi It is certified that error appears in the above-identified patent and that said Letters Patent is hereby corrected as shown below:

Column 14,
Line 7, before "region" delete "in the" and substitute -- in a -- in its place.

Signed and Sealed this

Thirteenth Day of December, 2005

JON W. DUDAS
*Director of the United States Patent and Trademark Office*